United States Patent Office 3,195,125
Patented July 13, 1965

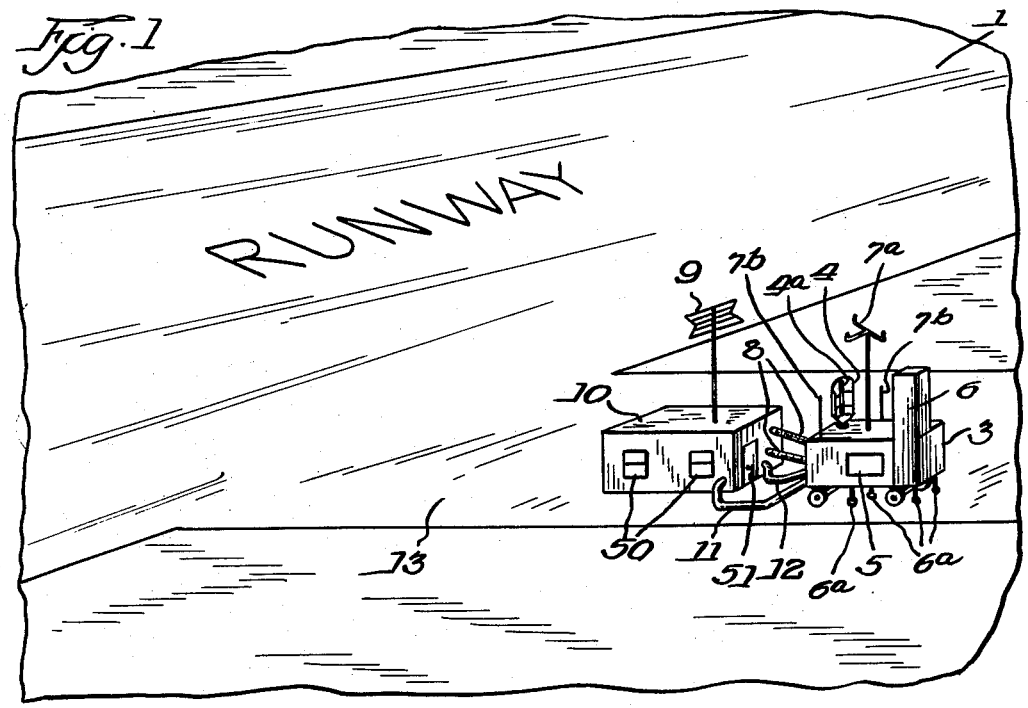

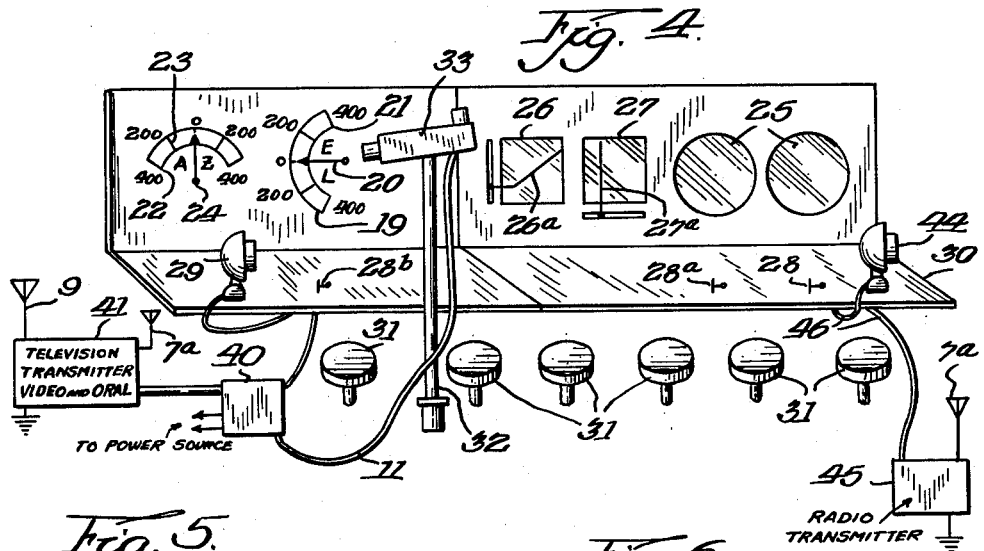
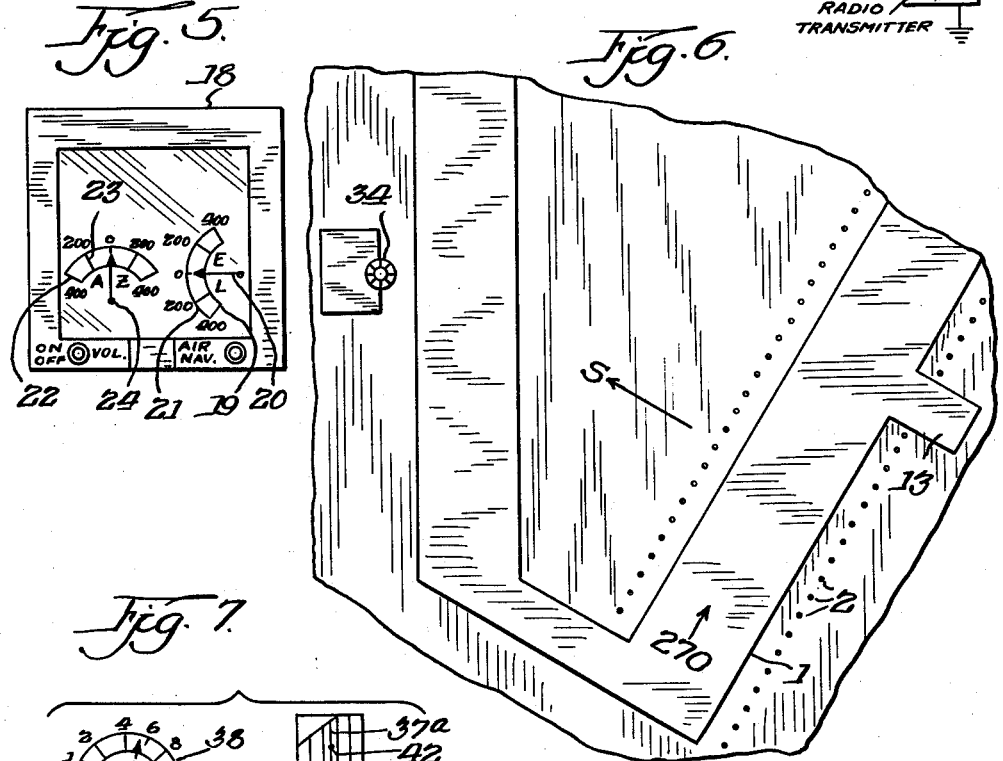
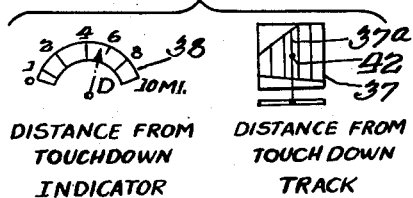

3,195,125
TELEVISION AID TO AIRCRAFT INSTRUMENT LANDING
Henry L. Reifler, Chicago, Ill.
(203 White Bridge Road, Nashville, Tenn.)
Filed Oct. 12, 1961, Ser. No. 147,407
2 Claims. (Cl. 343—6)

My invention relates to a television aid to aircraft instrument landing and particularly to use of television in connection with the ground controlled approach, hereafter designated (GCA), instrument landing system.

In making instrument landings assisted by GCA one of the biggest problems is in gaining the confidence of the pilot of the aircraft. Often valuable time passes and gasoline is consumed to the danger point before pilot confidence can be gained in the oral talkdown of the operator. The responsibility for the safety of the aircraft and its contents is primarily that of the pilot and if his confidence can be increased by the visual aid of television in instrument landing greater accuracy in the control of the aircraft during the landing operation will result and the need for several aproaches to landing will be lessened as will the hazard of a landing accident. In addition, the use of the visual aid of television in connection with GCA will contribute to all weather flying and particularly to the safety of landings made under bad visibility conditions, particularly fog.

In making instrument approaches for landing an aircraft whereby the pilot of the aircraft under instrument visibility conditions has the assistance of GCA in making the approach and landing this has been done by orally conveying the radar information by radio to the pilot. My invention provides a means of supplementing the oral radio instructions with a visual means inside the aircraft itself so that the pilot can see his relative position to a predetermined landing path as shown by the precision radar on the final approach. This I provide by installing a television receiver inside the cockpit of the aircraft and by having a camera and television transmitter in connection with the GCA for transmitting the precision radar information received by the final controller of the GCA. It is thought that a special frequency channel would be best for this television broadcast which would not be received by the public at large, i.e. on home television receivers, but would be received by the aircraft television receiver.

It is further evident that in accordance with my invention the landing final approach could be filmed and tape recorded for record or instructional or other purposes.

My invention further discloses an increase in the visual capabilities of the GCA equipment. The present equipment makes radar information available at the final controller's position for televising of azimuth and elevation radar information. My invention additionally discloses radar information showing the distance to landing touchdown on the runway. This information is available by distance lines on the radar scopes and was formerly read and radioed as part of the oral information relayed by the radar operators to the pilot but no special instruments in the GCA was provided whereby this could be visually presented from the final controller's position in the GCA.

Accordingly it is an object of my invention to provide an improved instrument landing system which will reduce the hazard of a landing accident to an aircraft landing under instrument visibility conditions.

It is another object of my invention to increase pilot confidence in the GCA instrument landing system.

It is a further object of my invention to provide means for visually conveying to an aircraft operating under instrument flight conditions, particularly low ceilings caused by clouds or fog, its relative position to the runway and its elevation above or below a predetermined glide path in addition to the oral instructions for landing.

It is another object of my invention to provide means for visually conveying to an aircraft on final approach to landing under instructions from GCA the distance to touchdown on the runway.

Still a further object of my invention is to supplement oral instructions for landing an aircraft from GCA with visual check by means of television, thereby to permit more careful and accurate guidance of the aircraft during its final approach to landing under instrument flying conditions and to reduce the hazard of an aircraft landing accident.

My invention will be better understood from the following description taken in connection with the accompanying drawing, and its scope will be pointed out in the appended claims.

In the drawing, FIGURE 1 is a perspective view of part of an airport runway showing a GCA set with television in accordance with my invention. FIGURE 2 is a plan view showing an airplane approaching the end of a runway. FIGURE 3 is another perspective view of a section of the aircraft showing the aircraft windshield and part of the cockpit interior with a television receiver mounted in accordance with my invention. FIGURE 4 is a perspective view showing the control center of the GCA and the control instruments and television camera and equipment arranged according to my invention fixedly to view the azimuth and elevation error meters. FIGURE 5 is a front view showing the television viewing screen in the aircraft with a picture that is sent from the GCA. FIGURE 6 is a top elevation view of a portion of an airport showing a control tower; and FIGURE 7 is a front view of an additional scope and meter to convey the distance from touchdown visually by television in the manner disclosed by this invention.

Referring now to FIGURE 1 of the drawing, I have shown a part of an airport runway 1 with a parking area 13 which may be an improved surface at one side thereof and intermediate the ends of the runway. At a distance of several hundred feet from the center of the runway on either side, the GCA mobile station 3 can be positioned, or in the event of the non-mobile equipment (not shown), antennas can be positioned here with the control center as shown in FIGURE 4 modified and remotely located in an airport control tower, as in FIGURE 6. Referring again to the mobile equipment as shown in FIGURE 1, I have indicated the GCA trailer as 3 and the search radar antenna as 4a and the antenna reflector as 4. The search radar antenna 4a is attached to the radar reflector 4 which is mounted to revolve 360 degrees; and the signals form the image on the search tubes (plan position indicators) 25 (FIGURE 4). The azimuth antenna housing 5 and the elevation antenna housing 6 complete the outline of the trailer, together with the communications antennas 7a and 7b. The azimuth antenna and its reflector and the elevation antenna and its reflector are not shown in detail but are behind the weather protection screens 5 and 6. I have not shown the prime mover which in the case of mobile equipment is a truck with equipment located therein, but instead have shown a building 10 having windows 50 and a door 51 erected nearby the trailer site to house the air conditioning equipment (not shown) which feeds by air hoses 8 to the trailer 3 and the electric power generating equipment (not shown) or connections which connect by power lines 12 to the trailer 3. In addition the building 10 houses a television transmitter 41 which is connected by lines 11 to a camera 33 in the trailer 3 as described following in connection with FIGURE 4. The television transmitter 41 broadcasts video from the antenna 9 and oral from the antenna 7a to aircraft in the immediate area. The GCA installation is carefully surveyed and positioned and the runway 1 is located on the azimuth scope 27 (FIGURE 4) by surveyed and positioned radar reflectors (not shown). A ground indication can be determined on the elevation scope 26. In addition the antennas can be adjusted in angle of sweep by jacks 6a.

Referring now briefly to FIGURE 2, I show a plan view of an airplane 14, having cockpit 15 approaching the end of runway 1 which may be outlined on each side by runway lights 2.

In FIGURE 3, I have shown part of the interior of cockpit 15 with a television receiver 18 mounted to one side. A second or duplicate receiver could be mounted on the opposite side of the cockpit in dual control aircraft. The interior instruments are shown only in outline, however, I have designated a compass 17b and altimeter 17a. In the case of instrument landing oral instructions from GCA radio can be received by headphones 16 as shown and the compass 17b and altimeter 17a are the instruments which are of primary importance in following instructions in stacking, circling and in final approach. In addition I provide television receiver 18 for simultaneously visually checking the radioed instructions.

Referring now to FIGURE 5, I have shown a front view of the television receiver 18 having well known controls with the screen showing separate azimuth and elevation indications as shown by the precision radar trackers in the GCA. If these needles 24 and 20 are shown in the zero (0) position, the aircraft is on course and on the glide path according to the radar tracking. If the azimuth needle 24 moves to the right or the left, the aircraft is to the right or the left of the predetermined desired azimuth and it is necessary for the pilot to correct his course appropriately to return to the approach line of the runway shown by the zero (0) position of the azimuth indicator 22. The calibration lines 23 indicate the extent of the deviation. Similarly if the elevation needle 20 is above or below the zero (0) position, the pilot must correct his desired glide to return to the predetermined glide path at zero (0) position on the meter 19 to avoid coming in too high or too low. The calibration lines 21 indicate the extent of the deviation. The oral instructions of the GCA controller should instruct the pilot as to the corrections to make, however, by visually watching the televised signals more accurate control of the aircraft will result. At the time the altimeter 17a reads zero (0) at sea level, or adjusted to the altitude of the airfield, if the azimuth needle 24 is held to zero (0) position and the elevation needle 20 is held to zero (0), the plane 14 should be alined with the runway in position to touchdown and land near the end of the runway 1.

In FIGURE 7, I have shown means 37 calibrated in miles whereby an operator can continuously track the distance from touchdown at the end of the runway or range of the airplane. An airplane appears as a spot or trace 42 on the range marked scope 37 which can be tracked by the track 37a which overlies the scope and extends parallel to the range marks. This scope is shown to be the same as the elevation scope but the track 37a is shifted by 90 degrees and the information can be shown on the meter 38 located at the final controllers panel. It is not necessary for the purposes of this invention to provide the circuit connections for these signals, as the existing GCA equipment is wired in duplicate. I propose to get the distance information from the radar information currently provided, but which is visual on the radar scopes, but is not tracked and is not adapted for televising. By means of this addition the television receiver 18 would receive the separate indication of the three meters, azimuth 22, elevation 19, and distance from touchdown 38. In GCA approaches to landing a long straight in glide is preferred beginning at a predetermined altitude and several miles from the end of the runway. As the aircraft approaches the runway, the distance from touchdown meter shows the information as to the position of the aircraft with relation to the end of the runway 1 and as it approaches zero (0), so should the altimeter so that at zero (0) feet at sea level, or adjusted to the altitude of the airfield and at zero (0) distance the plane should touchdown at the end of the runway and lined up with the runway for landing.

Referring now to FIGURE 4, I have shown an interior radar control center of a mobile GCA station including two search radar scopes 25, an elevation scope 26 with track 26a, and an azimuth scope 27 with track 27a. These scopes are cathode ray tubes. The operators of this equipment are provided with seats 31 and a table 30 and both the elevation 26 and azimuth 27 scopes have pedal units (not shown) for keeping the antennas focused on the aircraft approaching. The cursors 26a and 27a are movable in a well known way and are connected by mechanical and electrical means with the azimuth error meter 22 and the elevation error meter 19 at the final controllers position so that the meter arrows 20 and 24 are electrically deflected in accordance with the movement of the tracks 26a and 27a thereby indicating the position of the landing aircraft of the final controller by means of the calibrated distance lines 21 and 23. An example of the mechanical and electrical linkages between the tracking cursors and the error meters and of the electrical radar scope connections can be seen by reference to U.S. Patent No. 2,555,101, L. W. Alvarez and L. H. Johnston.

The search operators each have a microphone which operates through switches 28 and 28a and can broadcast on different frequencies, thereby to control several aircraft at one time and to control stacking in the area traffic control. One of the search operator's microphones 44 is connected by wires 46 through the switch 28 to the radio transmitter 45 which may be connected to antenna 7a. Radio receivers are present to permit reception of the pilot's comments in a two way communications system. The final controller likewise has a microphone as shown by 29 and microphone control switch 28b for speaking with the airplane pilot on final approach. The final controller can use a different frequency radio than either search operator. Each of the meters is appropriately scaled by feet of deviation from the zero position, but not necessarily calibrated each 200 feet as shown by lines 21 and 23.

In accordance with my invention I locate a camera 33 which may be mounted on pedestal 32 and connected by the lines 11 to the associated television equipment 40 and to the television transmitter 41 and the antenna 9. A power connection to the lines 12 is made. The camera 33 is mounted to view in focus the azimuth meter 22 and the elevation meter 19 so that the information shown on these meters can be scanned and televised to the airplane as previously described, and received on television receiver 18 in the aircraft. The controller's microphone 29 may be connected through the switch 28b to the associated television equipment 40 and radio and video television transmitter 41 and to antenna 7a.

It is evident that by including the meter 38 shown in FIGURE 7 calibrated in miles to indicate the distance from touchdown at the end of the runway 1, in the final controllers position, this information could be included in the telecast.

The control center can be located in the mobile equipment 3 or it can be remotely located as in FIGURE 6 in the control tower 34 located near the runway 1; and the telecast may originate from the tower in such case and perhaps may be differently located on the field. However, this would not depart from the spirit and contemplation of my invention.

While I have shown and described particular embodiments of my invention, it will be obvious to those skilled in the art that changes and modifications may be made without departing from my invention in its broader aspects, for example separate cameras could be used for viewing each of the separate meters, and I, therefore aim in the appended claims to cover all such changes and modifications as fall within the true spirit and scope of my invention.

What I claim as new and desire to secure by Letters Patent of the United States is:

1. A ground controlled approach aircraft instrument landing system comprising, first precision approach radar indicating means for indicating aircraft azimuth, second precision approach radar indicating means for indicating aircraft elevation, third precision approach radar indicating means duplicating said second precision approach radar indicating means in presentation for indicating aircraft range, first movable tracking cursor means for said first indicating means for comparing the actual azimuth with a predetermined path for an aircraft on final landing approach, first error metering means motivated by said first tracking cursor means for indicating the azimuth error in the landing path of the aircraft, second movable tracking cursor means for said second indicating means for comparing the actual elevation with a predetermined path for an aircraft on final landing approach, second error metering means separate from said first error metering means motivated by said second tracking cursor means for indicating the elevation error in the glide path of the aircraft, third movable tracking means for said third indicating means, third metering means separate from said first and second error metering means for indicating the aircraft range, television video camera means viewing said first, second and third metering means, and television transmitter means for transmitting television video to an aircraft thereby enabling guidance of the aircraft on landing approach.

2. The method of instrument landing on a landing field runway a flying aircraft from a ground controlled approach instrument landing station which includes the steps of, locating the position of the aircraft on a search radar scope in the vicinity of the landing field, orally directing the aircraft by radio to a position to begin the final landing approach, locating the aircraft on azimuth and elevation precision radar scopes, predetermining on each of said scopes a desired landing path, tracking the actual path of the aircraft on final landing approach on said precision radar scopes, comparing the actual path of the aircraft in azimuth and in elevation on separate error meters of azimuth and elevation with said predetermined desired landing path, determining the range of the aircraft, indicating the aircraft range on a separate range indicator, televising as viewed from said separate error meters and said separate range indicator the deviations in the actual path from the predetermined desired path of said aircraft on landing approach and the range to said aircraft, simultaneously orally radioing to the aircraft corrections to make in its flight, and receiving the television picture and oral radio in the aircraft so that the aircraft can be accurately aligned with the runway and with the predetermined glide path during the final approach to landing by visual reference to the television view of the separate error meters and separate range indicator received simultaneously with the oral corrections.

References Cited by the Examiner

UNITED STATES PATENTS

| 2,062,003 | 11/36 | Hammond | 343—6 |
| 2,459,481 | 1/49 | Wolff et al. | 343—6 |
| 2,514,351 | 7/50 | Smith | 343—6 |
| 2,527,967 | 10/50 | Schroder | 343—6 |
| 2,555,101 | 5/51 | Alvarez et al. | 343—5 |
| 2,585,855 | 2/52 | Sherwin et al. | 343—5 |
| 2,616,031 | 10/52 | Nosker | 343—6 |
| 2,637,022 | 4/53 | De France | 343—6 |
| 2,655,650 | 10/53 | Marshall | 343—6 |
| 2,782,411 | 2/57 | Mc Naney | 343—5 |
| 2,863,227 | 12/58 | Chubb et al. | 35—10.4 |
| 2,959,779 | 11/60 | Miller et al. | 343—6 |

CHESTER L. JUSTUS, *Primary Examiner.*